(12) United States Patent
Kief et al.

(10) Patent No.: US 8,196,968 B2
(45) Date of Patent: Jun. 12, 2012

(54) LATERAL PIPE CONNECTION ASSEMBLY

(75) Inventors: Richard F. Kief, Lake Oswego, OR (US); Tracy F. Wadley, Hillsboro, OR (US)

(73) Assignee: Sewer Tap Inc., Cornelius, OR (US)

( * ) Notice: Subject to any disclaimer, the term of this patent is extended or adjusted under 35 U.S.C. 154(b) by 0 days.

(21) Appl. No.: 11/759,765

(22) Filed: Jun. 7, 2007

(65) Prior Publication Data
US 2008/0303270 A1 Dec. 11, 2008

(51) Int. Cl.
*F16L 41/00* (2006.01)
(52) U.S. Cl. .................. 285/202; 285/204
(58) Field of Classification Search .......... 285/202, 285/203, 204, 139.2, 194, 211, 222, 140.1, 285/188, 192, 197, 214, 141.1, 237, 189, 285/196, 220, 180, 298, 199
See application file for complete search history.

(56) References Cited

U.S. PATENT DOCUMENTS

| | | | |
|---|---|---|---|
| 1,291,578 A * | 1/1919 | McPhail | 285/222 |
| 2,039,009 A * | 4/1936 | Lampman et al. | 285/211 |
| 2,308,310 A * | 1/1943 | Ruemelin, Jr. | 285/148.13 |
| 2,316,724 A * | 4/1943 | Sperry | 285/202 |
| 2,543,909 A * | 3/1951 | Hatheway, Jr | 285/194 |
| 3,033,514 A * | 5/1962 | Grosch | 251/145 |
| 3,246,132 A * | 4/1966 | Jordan et al. | 285/139.2 |
| 3,406,988 A * | 10/1968 | Jones | 285/24 |
| 3,424,481 A * | 1/1969 | Fulghum | 285/140.1 |
| 3,477,745 A * | 11/1969 | Williams et al. | 285/40 |
| 3,481,310 A * | 12/1969 | Alburger | 119/72.5 |
| 3,663,042 A | 5/1972 | Fowler | |
| 3,879,069 A * | 4/1975 | Oostenbrink | 285/140.1 |
| 3,922,107 A | 11/1975 | Fowler | |
| 3,981,061 A * | 9/1976 | Jackson et al. | 29/890.11 |
| 4,232,421 A | 11/1980 | Tucker | |
| 4,365,829 A * | 12/1982 | Fowler | 285/140.1 |
| 4,441,744 A * | 4/1984 | Oostenbrink et al. | 285/140.1 |
| 4,654,942 A * | 4/1987 | Rush et al. | 29/890.144 |
| 4,706,999 A * | 11/1987 | Hynes | 285/196 |
| 4,718,700 A * | 1/1988 | Horch et al. | 285/133.5 |
| 4,738,310 A | 4/1988 | Luttenberger | |
| 4,747,625 A * | 5/1988 | Mignet et al. | 285/197 |
| 4,759,459 A * | 7/1988 | Bailey et al. | 220/86.2 |
| 4,887,851 A * | 12/1989 | Rush et al. | 285/139.1 |
| 5,111,858 A * | 5/1992 | Aittama et al. | 285/921 |
| 5,129,684 A * | 7/1992 | Lawrence et al. | 285/192 |
| 5,150,928 A * | 9/1992 | Lodder et al. | 285/205 |
| 5,207,461 A * | 5/1993 | Lasko | 285/222 |
| 5,314,212 A * | 5/1994 | Sanders | 285/197 |
| 5,326,139 A * | 7/1994 | Corcoran | 285/197 |
| 5,466,016 A * | 11/1995 | Briody et al. | 285/204 |
| 5,518,277 A * | 5/1996 | Sanders | 285/197 |
| 5,692,858 A * | 12/1997 | Vaughan | 405/43 |
| 5,826,919 A * | 10/1998 | Bravo et al. | 285/139.2 |

(Continued)

OTHER PUBLICATIONS

Inserta Fittings Co., Lateral Connections Solutions INSERTA TEE, Brochure, 24 pages, Jan. 1, 2003.

*Primary Examiner* — Aaron Dunwoddy
(74) *Attorney, Agent, or Firm* — Finnegan, Henderson, Farabow, Garrett & Dunner, LLP

(57) ABSTRACT

An improved lateral pipe connection assembly that effects proper alignment of the lateral connection and restricts to the desired amount the penetration of the hub into the cored hole of the mainline pipe to which it is connected.

16 Claims, 2 Drawing Sheets

U.S. PATENT DOCUMENTS

| | | | | |
|---|---|---|---|---|
| 6,051,795 A * | 4/2000 | Fisher et al. | | 174/153 G |
| 6,089,615 A * | 7/2000 | Jappinen | | 285/21.2 |
| 6,113,156 A * | 9/2000 | Bea | | 285/140.1 |
| 6,224,115 B1 * | 5/2001 | Blasch et al. | | 285/139.2 |
| 6,357,617 B1 * | 3/2002 | Kido | | 220/562 |
| 6,406,067 B1 * | 6/2002 | Pritchatt | | 285/197 |
| 6,508,490 B1 * | 1/2003 | Hoffman | | 285/24 |
| 6,761,380 B2 * | 7/2004 | Pachciarz et al. | | 285/204 |
| 7,055,867 B2 * | 6/2006 | Faller | | 285/204 |
| 2004/0041397 A1 * | 3/2004 | Murphy | | 285/197 |
| 2004/0135367 A1 * | 7/2004 | Otsuga et al. | | 285/133.11 |
| 2007/0181342 A1 | 8/2007 | Duncan | | |

* cited by examiner

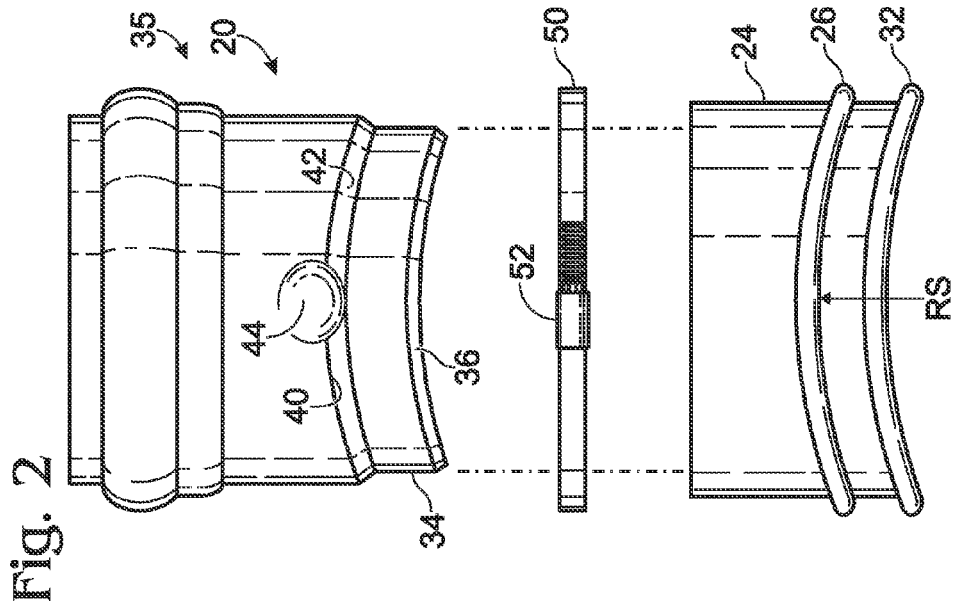
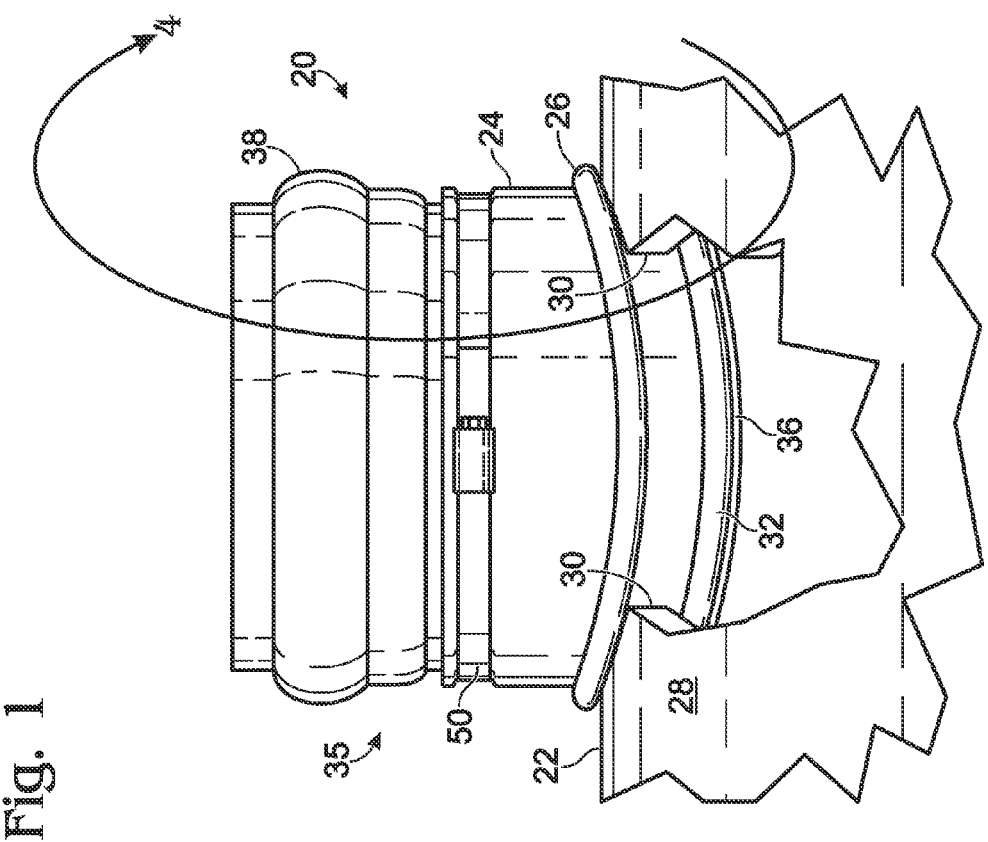

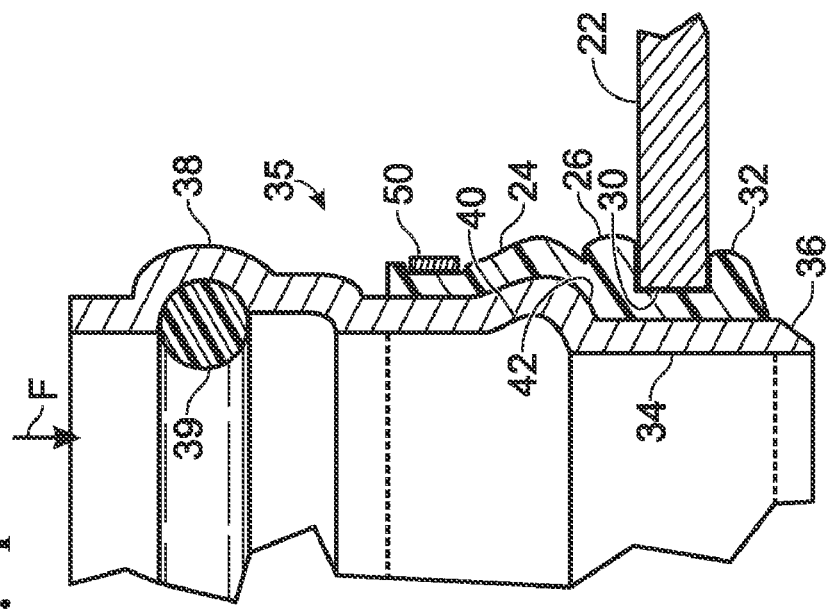
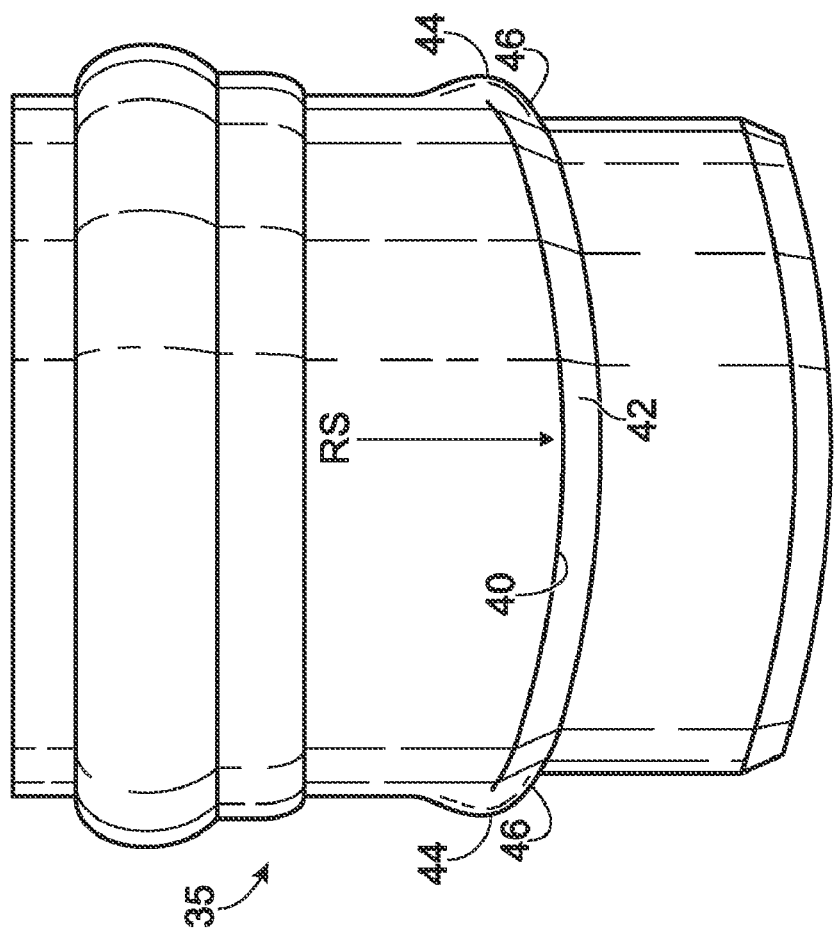

LATERAL PIPE CONNECTION ASSEMBLY

FIELD OF THE INVENTION

This invention pertains to what is known as a service connection between a main wastewater or storm water pipe and a lateral connecting pipe.

BACKGROUND AND SUMMARY OF THE INVENTION

Gravity-type pipe conveyance systems for waste or storm water generally include a mainline pipe or conduit to which service lateral pipes are connected. Many applications call for the connection of the lateral pipes to be made such that the lateral is perpendicular to the mainline pipe. Such connections are often referred to as "Tee" connections or service connections. Alternatively, the service lateral pipe can be connected at an angle (although with the long axis intersecting the long axis of the mainline pipe) and is thus designated, for example, as a "Wye" or 45-Degree service connection.

Service connections require a hole to be cored through the sidewall of the mainline pipe. The diameter of the cored hole is made slightly larger than the diameter of the service lateral pipe, which has a smaller diameter than the mainline pipe.

One effective service connection system is available from Inserta Fittings Inc., the assignee of the present application (www.insertatee.com) and marketed under the trademark INSERTA FITTINGS. That system comprises a three-piece service connection that is compression fit, without special tooling, into the hole that is cored through the wall of a wastewater or storm water mainline pipe. The three-piece service connection consists of a substantially rigid, cylindrical, hollow hub, one end of which fits into an elastomeric sleeve. The sleeved hub end is compression fit into the cored hole in the mainline pipe. A stainless steel band is fastened around the sleeve to secure it to the hub. The exposed end of the hub defines a conventional bell component of a bell and spigot joint, and receives the spigot end of the service lateral that is to be connected. This type of service connection may be used with any of a wide variety of pipe types (concrete, PVC, corrugated, etc).

In some instances the cored hole in the mainline pipe is not properly formed. As a result, the central axis of the hole does not intersect the long axis of the mainline pipe. Consequently, the misaligned hole made in the sidewall of the mainline pipe will be oblong rather than circular. This may result in attendant misalignment of the service connection with the mainline pipe, hence misalignment of the service lateral.

It is also possible for an installer to apply excessive axial force on the service lateral pipe when fitting the spigot end of that pipe into the connection hub. In such an instance, and especially where the cored hole is not quite circular, the excessive force may cause an undesirable amount of penetration of the sleeved end of the hub into the mainline pipe, which can result in interference with the operation and/or inspection of the mainline pipe.

The present invention is directed to an improved lateral pipe connection assembly that effects proper alignment of the lateral connection and restricts to the desired amount the penetration of the hub into the cored hole of the mainline pipe.

BRIEF DESCRIPTION OF THE DRAWINGS

FIG. 1 is side view of one preferred embodiment of a service lateral pipe connection assembly constructed in accord with the present invention.

FIG. 2 is an exploded view of the service lateral pipe connection assembly.

FIG. 3 is front view of the hub component of the service lateral pipe connection assembly.

FIG. 4 is a cross sectional view of the service lateral pipe connection assembly, taken along line 4-4 of FIG. 1.

DETAILED DESCRIPTION OF A PREFERRED EMBODIMENT

The service lateral pipe connection assembly 20 (hereafter referred to as "service connection") is shown in FIG. 1 completely connected to the mainline pipe 22, which is shown partly cut away. FIG. 1 shows the service connection 20 made to a solid-walled mainline pipe such as a PVC sewer pipe. It will be understood, however, that any of a variety of pipe configurations (ribbed, corrugated, thick-walled concrete etc) may be used as a mainline pipe. Moreover, the structure into which the service connection is made is not limited to pipes. The service connection may be similarly made to any structure requiring a lateral pipe connection, such as manholes, catch basins, vaults, and electrical boxes for example, such structures being made from any of a variety of materials (concrete, fiberglass etc).

With reference to FIGS. 1-4, the service connection 20 includes a generally cylindrical elastomeric sleeve 24, which is preferably made of rubber. The end of the sleeve that fits into the mainline pipe 22 is shaped to match the curvature of that pipe. In this embodiment, the sleeve includes an outwardly protruding stop 26 that is integrally formed with the sleeve and abuts the outer surface 28 of the mainline pipe 22 (FIG. 1). Specifically, the stop 26 is located on the outer surface of the cylindrical sleeve 24 and arranged so that when the sleeve is inserted into the hole 30 that is cored through the mainline pipe 22, the stop will rest against the upper surface 28, at the edge of the hole 30. As such, the stop 26 is shaped to define a sinusoidal path around the sleeve. The repeating curvature "RS" of the sinusoidal stop 26 (FIG. 2) conforms to the radius of the mainline pipe to which the service connection is made (here the radius being measured to the outside diameter of the mainline pipe 22).

In this embodiment, where the connection is made to a relatively thin-walled pipe 22 the outermost end of the sleeve 24 is also provided with a resilient rib 32 that is compressed or folded and moved through the cored hole 30 as the sleeve is inserted. Once inside of the pipe 22 the rib 32 resiles or unfolds and bears against the inner wall of the pipe to resist removal of the sleeve from the hole. The rib 32, like the stop 26, extends around the sleeve in a sinusoidal path.

Once the sleeve 24 is seated within the cored hole 30 of the pipe 22, the inner end 34 of the rigid, cylindrical hub 35 is inserted into the sleeve. Preferably, the hub 35 is made of lightweight, sturdy, incompressible material, such as PVC.

The outside diameter of the inner end 34 of the hub 35 is slightly larger than the inside diameter of the sleeve 24 so that the sleeve stretches slightly to snugly fit over the hub. The innermost end of the hub is tapered 36 to facilitate insertion of the hub into the sleeve. When the hub inner end 34 is fully inserted into the sleeve 24 and the sleeved end of the assembly inserted into the cored hole, the sleeve is compressed by the wall of the hub (see FIG. 4) against the edge of the hole 30 in the pipe 22, thereby sealing the connection between the sleeved hub and pipe.

As noted earlier, the exposed end 38 of the hub 35 (FIG. 4) is shaped to define a conventional bell component of a bell and spigot joint. That end 38 carries a conventional internal gasket 39, and receives the spigot end or the service lateral pipe (not shown) that is to be connected to the mainline. The bell-component end of the hub is shown by way of example only. It will be appreciated that the exposed end of the hub can be configured for other connections.

With particular reference to FIGS. 2 and 3, the hub 35 made in accordance with the present invention includes a shoulder 40 that projects outwardly from the outer surface of the hub 35 between the inner end 34 and remainder of the hub. Along its length, the shoulder 40 is shaped to conform to the sinusoidal shape of the stop 26 on the sleeve, described above. The leading edge 42 of the shoulder is sloped or beveled.

When the hub 35 if fully inserted in the sleeve 24, the shoulder leading edge 42 bears against the interior of the sleeve 24 in a manner such that an axial, installation force applied to the hub, as depicted by arrow F in FIG. 4, will have the effect of seating the hub shoulder 40 against the stop 26 around the entire edge of the hole 30.

The seating provided by the interaction of the shoulder 42 and stop 26 as just described effects proper alignment of the hub 35 (hence, the lateral pipe) in the hole 30, and prevents undesired excessive penetration of the hub into the cored hole 30 of the pipe, which might occur, as noted above, in instances where the hole 30 is not properly formed and/or excessive axial force is applied to the connected lateral service pipe.

A pair of optional, diametrically opposed bosses 44 (FIGS. 2 and 3) are also formed in the hub. Each boss 44 comprises a generally rounded projection of the outer wall of the hub, extending outwardly slightly more than the outward extent of the shoulder 40. The leading face or edge 46 of each boss 44 is generally contiguous with the leading edge 42 of the shoulder 40 but is shaped to be relatively steeper (that is, closer to orthogonal with the outer surface of the hub) than the sloped leading edge 42 of the shoulder 40. Thus, the bosses 44 serve to provide sure stops or limits against excessive penetration of the hub into the pipe 22, and supplement the seating and aligning effect of the sinusoidal shaped shoulder 40 discussed above.

Moreover, the relatively greater extent of projection of the bosses 44 from the outer surface of the hub 35 causes a relatively tight engagement with the elastomeric sleeve 24, thereby restricting the inadvertent removal of the sleeve 24 from the hub 35 should the hub or connected lateral pipe be pulled slightly (away from the mainline pipe 22) during the connection process.

When the sleeved hub 35 is properly fit into the hole 30 in the mainline pipe, a simple stainless steel band 50 is tightened (using a fastener as shown at 52) around the outer end of the sleeve to secure the sleeve and hub.

While the foregoing description was made in the context of a preferred embodiment, it is contemplated that modifications to that embodiment may be made without departure from the invention as claimed. For example, the shoulder 40 may be a separate piece that is fastened to the separately manufactured hub. Also, the shoulder need not be a continuous member but could instead be made up of a few discrete projecting portions extending along the same sinusoidal path defined by the continuous version of the shoulder.

The invention claimed is:

1. A pipe connection assembly, comprising:
an elastomeric sleeve having a peripheral, radially outwardly protruding stop formed thereon, the stop having a circumferential length that defines a sinusoidal-shaped path configured for engaging an aperture in a pipe wall; and a generally cylindrical rigid hub having an outer surface, one end of the hub having an outer diameter larger than an inner diameter of the sleeve but configured to fit inside of the sleeve by compression fit;
wherein the hub has a rigid shoulder projecting radially outwardly from the outer surface of the hub, such that the shoulder abuts an inner surface of the sleeve adjacent to the peripheral stop and conforms to the sinusoidal shaped path of the peripheral stop, when the hub is inserted into the sleeve;
wherein the sleeve and hub are assembled with the shoulder inside of the sleeve so that the shoulder on the hub is adjacent to the stop on the sleeve; and
wherein a pair of diametrically opposed bosses protrude outwardly from the shoulder.

2. The connection assembly of claim 1 wherein the shoulder has a circumferential length that extends substantially continuously around the outer surface of the hub.

3. The connection assembly of claim 2 wherein the shoulder has a beveled leading edge.

4. The connection assembly of claim 3 wherein the beveled leading edge is sloped by an amount that varies along the length of the shoulder so that some portions of the leading edge have a slope that is steeper than other portions of the leading edge.

5. The connection assembly of claim 1 wherein the shoulder is comprised of discrete portions.

6. The connection assembly of claim 1 wherein the shoulder is integrally formed with the hub.

7. The connection assembly of claim 1 wherein the shoulder is attached to the hub.

8. The connection assembly of claim 1 wherein the shoulder has a beveled leading edge and wherein the bosses are contiguous with the leading edge of the shoulder.

9. A pipe connection assembly, comprising:
a flexible sleeve having first and second peripheral protruding ridges formed thereon, each of the ridges having a circumferential length that defines a sinusoidal valley between the ridges for engaging an aperture in a pipe wall; and
a generally cylindrical rigid hub comprising:
an outer surface;
an insertion end having an outer diameter larger than an inner diameter of the sleeve but configured to fit inside of the sleeve by compression fit; and
a shoulder extending around and projecting radially outwardly from the outer surface of the hub;
wherein, when the hub is inserted into the sleeve, the shoulder abuts an inner surface of the sleeve adjacent to one of the ridges, thereby pressing the sinusoidal valley of the flexible sleeve against the aperture in the pipe wall
wherein the sleeve and hub are assembled with the shoulder inside of the sleeve so that the shoulder on the hub is adjacent to one of the ridges on the sleeve; and
wherein a pair of diametrically opposed bosses protrude outwardly from the shoulder.

10. The connection assembly of claim 9 wherein the shoulder has a circumferential length that extends substantially continuously around the outer surface of the hub.

11. The connection assembly of claim 10 wherein the shoulder has a beveled leading edge.

12. The connection assembly of claim 11 wherein the beveled leading edge is sloped by an amount that varies along the length of the shoulder so that some portions of the leading edge have a slope that is steeper than other portions of the leading edge.

13. The connection assembly of claim 9 wherein the shoulder is comprised of discrete portions.

14. The connection assembly of claim 9 wherein the shoulder is integrally formed with the hub.

15. The connection assembly of claim 9 wherein the shoulder is attached to the hub.

16. The connection assembly of claim 9 wherein the shoulder has a beveled leading edge and wherein the bosses are contiguous with the leading edge of the shoulder.

* * * * *